US012427554B2

(12) United States Patent
Harris

(10) Patent No.: US 12,427,554 B2
(45) Date of Patent: Sep. 30, 2025

(54) SMOKING VESSEL CLEANING APPARATUS

(71) Applicant: Joshua Earl Harris, Chase, MI (US)

(72) Inventor: Joshua Earl Harris, Chase, MI (US)

(73) Assignee: Joshua Earl Harris, Chase, MI (US)

( * ) Notice: Subject to any disclaimer, the term of this patent is extended or adjusted under 35 U.S.C. 154(b) by 32 days.

(21) Appl. No.: 18/216,538

(22) Filed: Jun. 29, 2023

(65) Prior Publication Data

US 2024/0001412 A1 Jan. 4, 2024

Related U.S. Application Data

(60) Provisional application No. 63/356,989, filed on Jun. 29, 2022.

(51) Int. Cl.

| | |
|---|---|
| ***B08B 9/032*** | (2006.01) |
| ***A24F 9/04*** | (2006.01) |
| ***B08B 3/08*** | (2006.01) |
| ***B08B 13/00*** | (2006.01) |
| ***F04B 43/02*** | (2006.01) |
| ***F24H 15/223*** | (2022.01) |

(52) U.S. Cl.

CPC .............. *B08B 9/0321* (2013.01); *A24F 9/04* (2013.01); *B08B 3/08* (2013.01); *B08B 13/00* (2013.01); *F04B 43/02* (2013.01); *F24H 15/223* (2022.01); *B08B 2203/007* (2013.01); *B08B 2209/032* (2013.01)

(58) Field of Classification Search

None

See application file for complete search history.

(56) References Cited

U.S. PATENT DOCUMENTS

| | | | | |
|---|---|---|---|---|
| 5,307,389 | A * | 4/1994 | Meneely | B08B 9/0933 220/4.12 |
| 6,568,409 | B1 * | 5/2003 | Fleck | B08B 3/12 134/186 |
| 2019/0090535 | A1 * | 3/2019 | Niitsuma | A24F 9/12 |
| 2021/0235962 | A1 * | 8/2021 | Mcinerney | A47L 15/4209 |

* cited by examiner

*Primary Examiner* — Kaj K Olsen
*Assistant Examiner* — Pradhuman Parihar
(74) *Attorney, Agent, or Firm* — The Watson IP Group; Jovan N. Jovanovic

(57) ABSTRACT

An apparatus for cleaning a smoking vessel including a holding tank, a heating element, a first cleaning circuit, a pump and a secondary tank. The holding tank has a return port, an outlet port and a secondary tank port. The heating element is positioned in proximity to the holding tank. The first cleaning circuit has a first portion in fluid communication with a cavity of a smoking vessel, and a second portion fluid communication with the first and second portions also being in communication with the holding tank. The pump circulates through the first cleaning circuit. The secondary tank is in communication with the secondary tank port of the holding tank and further including a vent.

16 Claims, 3 Drawing Sheets

SMOKING VESSEL CLEANING APPARATUS

CROSS-REFERENCE TO RELATED APPLICATION

This application claims priority from U.S. Provisional Patent Application Ser. No. 63/356,989 filed on Jun. 29, 2022, entitled "Smoking Vessels and Utilities Cleaning Machine", the entire disclosure of which is hereby incorporated by reference in its entirety.

BACKGROUND OF THE DISCLOSURE

1. Field of the Disclosure

The disclosure relates in general to a cleaning system and apparatus, and more particularly, to a cleaning system and apparatus for removing residue and debris which accumulates on and within a smoking vessel or device.

2. Background Art

People often consume medical-grade herbs and tobacco products through a number of methods, including water pipes, traditional pipes, and other smoking devices. As these herbs are smoked, they create a sticky and difficult to remove resin which becomes coated on the inside surfaces of the smoking device or vessel. This resin and debris is often difficult to remove from the surfaces of a smoking vessel, even with the use of soap and water. The process becomes even more challenging when a smoking vessel contains multiple slots, holes, or chambers which create a more pleasant smoking experience for a consumer.

A currently utilized method for cleanings smoking vessels involves soaking the smoking vessel or device in a solvent, and shaking the vessel to remove the thick and sticky resin. On occasion, a physical grit is further used in an attempt to scrub the resin from the vessel surfaces. These by-hand cleaning methods are time consuming and yield varying success rates. Additionally, they may be messy and cause sticky resin or harmful solvents to end up in places where they don't belong.

SUMMARY OF THE DISCLOSURE

The disclosure is directed to an apparatus that includes a housing, a holding tank assembly, a secondary tank, a pump, two cleaning circuits, and an accessory cleaning box. The housing is comprised of three pairs of planar walls configured to construct a rectangular cube, with a cavity defined therein. The holding tank assembly is contained within the housing, and holds a solvent which will be heated by a heating element and pumped through one or both of the cleaning circuits. As the solvent is drawing through the cleaning circuits by the pump, it is directed through a smoking vessel and/or a sealable accessory box containing smoking devices to be cleaned. The solvent then continues through the pump and back into the holding tank to be cycled through the circuits until the smoking vessels are clean. As the solvent is heated and amounts vaporize off, the fumes will travel into the secondary tank where they will condense and may be recycled for future use. This prevents harmful solvent vapors from being released into the atmosphere and surrounding area.

In at least one configuration, the apparatus is configured without a completely enclosed housing assembly. This allows an operator direct access to the holding tank assembly and its related components.

In at least one configuration of the apparatus, the apparatus further comprises check valves to prevent water and condensed solvent from flowing back into the solvent holding tank.

In at least one configuration of the apparatus, the holding tank assembly further comprises a temperature sensor and switch which controls power to the heating element. This configuration allows for automatic temperature control to maintain the solvent temperature within a desired range.

In at least one configuration of the apparatus, the holding tank assembly further comprises a level sensor and switch which prevents the pump from operating if the fluid level is too low within the holding tank.

In at least one configuration of the apparatus, the apparatus comprises only one cleaning circuit.

In at least one configuration of the apparatus, the apparatus comprises two or more cleaning circuits.

In another aspect of the disclosure, the disclosure is directed to an apparatus for cleaning a smoking vessel. The apparatus comprises a holding tank, a heating element, a first cleaning circuit, a pump and a secondary tank. The holding tank defines a cavity having at least one return port, at least one outlet port and a secondary tank port, each of which is in communication with the cavity. The holding tank is structurally configured to hold a solvent. The heating element is positioned in proximity to the holding tank sufficient to heat the cavity of the holding tank. The first cleaning circuit has a first portion with a first end in fluid communication with the at least one outlet port and a second end in fluid communication with a cavity of a smoking vessel. Additionally, a second portion has a first end in fluid communication with the cavity of the smoking vessel and a second end in fluid communication with the at least one return port. The pump is positioned in at least one of the first portion and the second portion of the first cleaning circuit and is structurally configured to circulate fluid through the first cleaning circuit. The secondary tank has an inlet in fluid communication with the secondary tank port of the holding tank. The inlet is spaced apart from a bottom of the secondary tank, and also includes a vent.

In some configurations, the apparatus further comprises a housing having a housing cavity, wherein the holding tank is positionable within the housing.

In some configurations, the housing includes an upper wall which is movable so as to provide access to the housing cavity.

In some configurations, the upper wall is hingedly coupled to a sidewall of the housing.

In some configurations, at least one of the at least one return port, the at least one outlet port and the at least one secondary tank port extends through a sidewall of the housing.

In some configurations, the apparatus further comprises a second cleaning circuit including a first portion with a first end in fluid communication with the at least one outlet port and a second end in fluid communication with an accessory cavity of an accessory cleaning box. Additionally, a second portion is provided which has a first end in communication with the accessory cavity and a second end in fluid communication with the at least one return port. The accessory cleaning box has a movable lid so as to provide access to the accessory cavity.

In some configurations, the second portion of the first cleaning circuit joins the second portion of the second cleaning circuit prior to a pump inlet so that the pump is structurally configured to circulate fluid through the first cleaning circuit and the second cleaning circuit simultaneously.

In some configurations, the first portion of the first cleaning circuit includes a first valve between the first end and the second end. The first valve provides selective communication between the first and second ends of the first cleaning circuit.

In some configurations, the first portion of the second cleaning circuit includes a second valve between the first end and the second end. The second valve provides selective communication between the first and second ends of the second cleaning circuit.

In some configurations, the secondary tank further comprises a recycle port extending from a lower end of the secondary tank.

In some configurations, the apparatus further comprises an inlet check valve positioned between the secondary tank and the holding tank, the check valve structurally configured to prevent backflow from the secondary tank to the holding tank.

In some configurations the pump comprises a self-priming diaphragm pump.

In some configurations, the holding tank has a capacity of two gallons.

In some configurations, the heating element further comprises a temperature sensor controlling an electronic switch wherein, the electronic switch can be configured to selectively energize and deenergize the heating element, to, in turn, maintain the temperature of the solvent within a desired range.

In some configurations, the temperature sensor and electronic switch are structurally configured to allow for automatic control of the heating element.

In some configurations, the pump further comprises a level sensor coupled to an electronic switch wherein the level sensor can be configured to selectively energize and deenergize the pump.

In some configurations, the pump further comprises a timer coupled thereto, to, temporally control the operation of the pump.

In another aspect of the disclosure, the disclosure is directed to a method of using an apparatus for cleaning a smoking vessel comprising the steps of: providing the smoking vessel, the smoking vessel having an inlet and an outlet and a cavity; providing the apparatus as set forth herein; attaching the second end of the first portion of the first cleaning circuit to the inlet of the smoking vessel; attaching the first end of the second portion of the first cleaning circuit to the outlet of the smoking vessel; placing solvent in the holding tank; activating the pump; and circulating solvent through the first cleaning circuit.

In some configurations, the method further includes the step of activating the heating element.

BRIEF DESCRIPTION OF THE DRAWINGS

The disclosure will now be described with reference to the drawings wherein.

DETAILED DESCRIPTION OF THE DISCLOSURE

Figure 1:
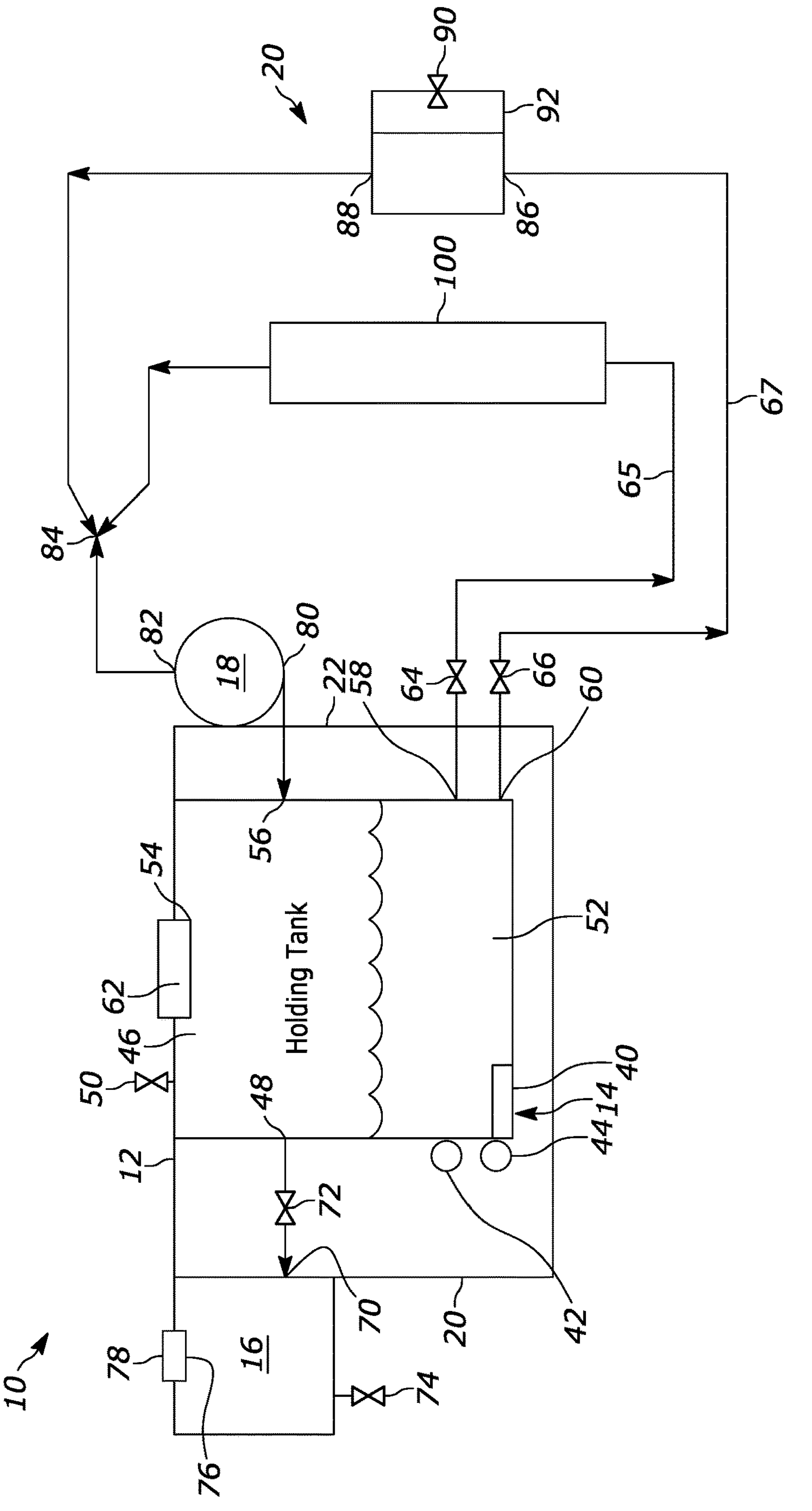
FIG. 1 of the drawings is a schematic of the smoking vessel cleaning apparatus.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, a schematic of a smoking vessel cleaning apparatus 10 is disclosed, wherein a housing assembly 12 forms a cavity within which holding tank assembly 14 is secured. Holding tank assembly 14 is configured to allow pump 18 to draw fluid, currently disclosed as a solvent 52, from the outlets of holding tank 46, through two cleaning circuits, and back into holding tank 46. The two cleaning circuits direct flow of solvent 52 through smoking vessel 100 and accessory cleaning box 20, which effectively cleans the vessel and contents of the box as the solvent passes through. Holding tank 46 additionally allows for fluid communication with secondary tank 16 which functions to maintain and recycle solvent as it is vaporized in the system, and in particular, the holding tank 46.

Housing assembly 12 as disclosed is configured to be a rectangular prism constructed, preferably, of welded steel, with an openable hinged top wall 28 to allow access to the cavity within. Housing 12 is configured to prevent a user or operator from directly contacting the inner holding tank assembly, which will become heated during operation of the apparatus. The inner cavity of housing 12 additionally provides an area for electronic components and various piping or axillary features to be contained in an aesthetic manner within the housing.

The top wall, or any of the other planar walls, of the housing may be removable to allow for features of the apparatus to be inserted or removed into the cavity, or the housing may be permanently fixed or welded to permanently enclose the additional features therein. In some embodiments the housing may be a configuration of beams or support members designed to secure holding tank assembly 14 and its related components. It is additionally contemplated that the apparatus may be configured without a housing assembly, wherein a frame may be utilized, or the components may be directly coupled to the holding tank, which may itself serve as a frame.

Holding tank assembly 14 is comprised of holding tank 46, heating element 40 level sensor 42, temperature sensor 44, and inlet check valve 50. In one embodiment, holding tank 46 has a fill port 54 which extends through the upper surface of the tank, as well as through the respective housing wall, to allow for solvent 52 to be poured into the tank. In this embodiment, fill port 54 will have a corresponding lid 62 which seals the tank and accounts for necessary pressure fluctuations as a result of operating the apparatus. Solvent 52 may be comprised of numerous known solvents of varying concentrations, including but not limited to isopropyl alcohol, ethanol, or other cleaning solutions known to those of ordinary skill in the art. In some embodiments, the solvent is 90%-99% isopropyl alcohol. In the current embodiment, holding tank 46 is sized to hold a total volume of roughly 2 gallons, but alternate tanks sizes and dimensions are contemplated.

Holding tank 46 has disposed thereon a return port 54, first outlet port 58, second outlet port 60, and secondary tank port 48, all of which extend through a respective wall of the holding tank, with housing 12 additionally having corresponding ports through respective planar walls of the housing.

First outlet port 58 is positioned proximate the lower end of the solvent holding tank 56, such that a flexible tube may extend from first outlet port 58, through sidewall 22 of the housing, and form a first fluid flow circuit 65 which transports solvent through smoking vessel 100. This first circuit continues through smoking vessel 100 to run through pump 18 and return the dirtied solvent into the holding tank. A similar second circuit 67 is constructed in parallel to extend a flexible pipe from second outlet port 60, to run solvent through one or more other structures, such as, for example, accessory cleaning box 20, and return through pump 18 into holding tank 46. Accessory cleaning box 20 comprises an inlet port 86 and outlet port 88, as well as a lid 92 which may be opened to allow a user to put various smoking devices for cleaning thereinto. Lid 92 is constructed to be at least substantially water-tight when closed so as to maintain vacuum and prevent leaking as the solvent is pulled through the second circuit 67. A vent 90 is positioned on accessory cleaning box 20 to allow air to vent as the box is filled with solvent. In some embodiments the vent 90 is comprised of a manual ball valve.

The flexible tube in some embodiments comprises a polymer which is compatible with the corresponding solvents, whereas other embodiments may be comprised of a rigid piping structure, or a combination of the two. Each circuit 65,67 may include rubber sealing connectors to allow for a water-tight while preferably removable seal between the tubing and the smoking vessel/accessory cleaning box. In some embodiments, circuit 65 may be connected to the smoking vessel 100 by way of rubber stoppers or holed-plugs inserted into the input and output of the smoking vessel. In some embodiments, circuit 67 is connected to accessory cleaning box 20 by way of threaded and screwable attachments. The water-tight seal allows a vacuum to be formed to draw solvent through each circuit, as will be discussed below.

It will be understood that the first circuit includes a first portion that extends between the holding tank and the smoking vessel, and a second portion that extends between the smoking vessel and the holding tank, each of the portions includes a first end and a second end. Similarly, the second circuit includes a first portion that extends between the holding tank and the accessory box and a second portion which extends between the accessory box and the holding tank, each of the portions include a first end and a second end.

A first outlet valve 64 is positioned on first circuit 65 to selectively control solvent exiting holding tank 46. In the configuration shown, first valve 64 is a manual ball valve, though other types of valves are contemplated. A similar second outlet valve 66 is positioned on second circuit 67 to selectively control solvent exiting holding tank 46. One of valves 64, 65 may be closed to isolate a circuit and allow solvent to flow through either first circuit 65 or second circuit 67.

After first circuit 65 and second circuit 67 direct flow through smoking vessel 100 and accessory box 20 respectively, the two lines are directed into y-valve 84 to merge the circuits prior to entering pump 18. This allows for both circuits to have fluid drawn through them with a single pump or pump inlet, while other configurations may use multiple pumps. In the embodiment shown, the circuit tubing is merged though a y-valve 84, though in some configurations the circuits may be merged by other types of couplings.

As further shown in FIG. 1, pump 18 is comprised of a self-priming diaphragm pump with a pump inlet 82 and a pump outlet 80. Pump 18 draws solvent from holding tank 46 through each circuit 65,67, and into pump inlet 82, after the circuit flows are combined through y-valve 84. In the current embodiment, circuit valves 66,64 may be utilized to isolate the flow through either or both of circuits 65, 67. The solvent is discharged out of the pump though pump outlet 80 and is directed back into holding tank 46 though return port 56. The current embodiment utilizes a self-priming diaphragm pump to pull fluid as opposed to pushing fluid through the circuits in order to minimize pressurization of the transport tubing and causing the removable seals to disconnect from smoking vessel 100 or accessory box 20.

Holding tank assembly 14 further includes a heating element 40 which functions to heat the solvent 52 contained within holding tank 46. Heating element 40 in the current embodiment is in contact with the bottom of holding tank 46 to provide for conductive heating, while alternate heating means, such as an internal inline heating system, among others, are contemplated.

Holding tank assembly 14 further comprises a level sensor 42 and temperature sensor 44, which detect the volumetric level and temperature of the solvent within the tank respectively. In some embodiments, these sensors may be in electronic communication with the power source and/or pump 18 to provide additional control or safety measures to the apparatus. For example, the temperature sensor 44 in the embodiment shown is configured to provide heating via heating element 40 only when necessary to keep solvent 52 within a user desired temperature range. Additionally, the current embodiment provides for level sensor 42 to communicate with the power supply and/or pump 18 to only initiate operation of the pump if there is fluid within the holding tank.

An inlet check valve 50 is disposed on the upper surface of the holding tank 46 which allows for inward airflow into the holding tank during the cooling process.

A secondary tank 16 is in fluid communication with holding tank 14 by means of the secondary tank port 48 and inlet port 70. Among other benefits, the second tank allows for heated and pressurized alcohol fumes to safely vent from the holding tank to the secondary tank 16. In some embodiments, the secondary tank 16 is initially filled with some amount of water to cause the vaporized fumes to condense and collect within the secondary tank. This can minimize and/or entirely prevent harmful and/or dangerous fumes from being vented to the atmosphere as the apparatus operates. An inlet check valve 72 is positioned inline between secondary tank port 48 and inlet port 70, this valve 72 precludes and/or minimizes water or condensed fumes from flowing back into holding tank 46, which may be particularly useful while the apparatus cools. A vent 76 with corresponding lid 78 is disposed on secondary tank 16 to allow the tank to be open to the atmosphere. Secondary tank

16 additionally comprises a recycle port 74 which allows for the condensed fumes to be emptied from tank 16 and subsequently reused or recycled back into holding tank 46.

Figure 2:
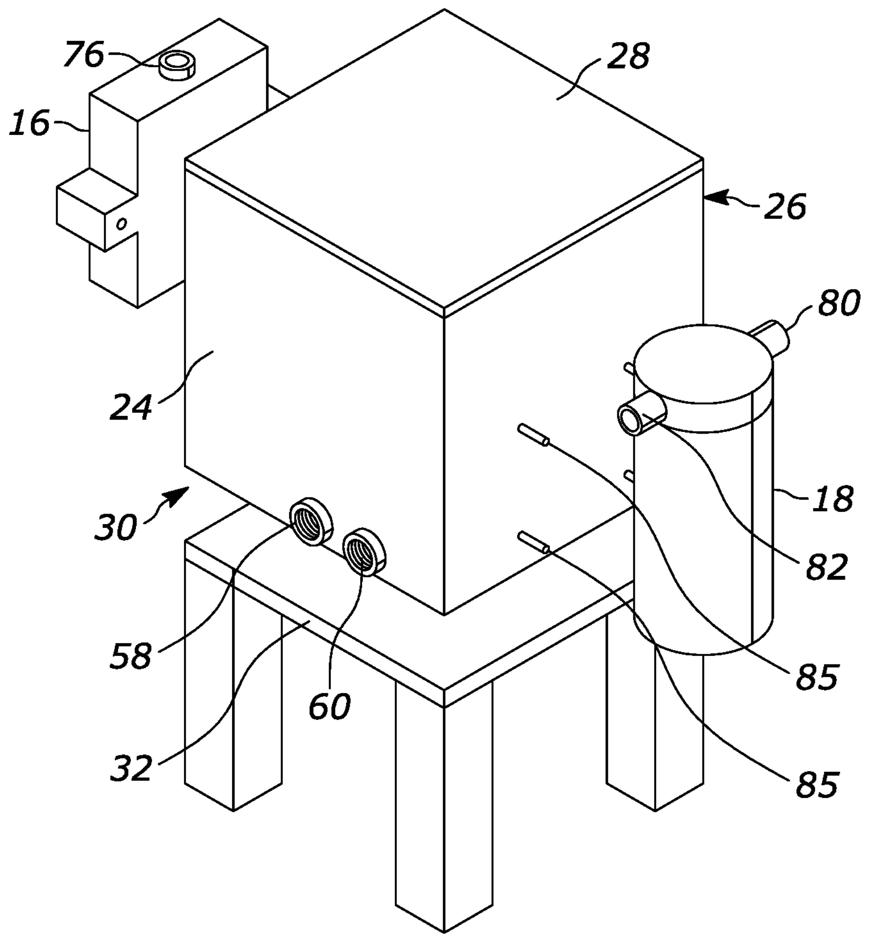
FIG. 2 illustrates an exploded view of the smoking vessel cleaning apparatus, showing the housing, pump, and secondary tank, in accordance with at least one configuration.

Referring now to FIG. 2, the smoking vessel cleaning apparatus 10 is shown as comprising a housing assembly 12, with three pairs of planar walls configured to form a rectangular prism. Pump 18 is disposed and connected to sidewall 22 by pump attachment pins 85. Similarly, secondary tank 16 is attached to sidewall 20 of the housing 12. First and second outlet ports 58,60 and positioned on sidewall 24, in a position that would be near the bottom of the holding tank 46 which is secured within the housing. In the current embodiment, the apparatus includes two outlet ports for the formation of two cleaning circuits. It is also contemplated that some embodiments may have more than two cleaning circuits with corresponding outlet ports, and some embodiments may only have one cleaning circuit with outlet port. FIG. 2 also demonstrates the apparatus 10 positioned atop stand 32, with the bottom flat surface 30 in contact with the stand.

Figure 3:
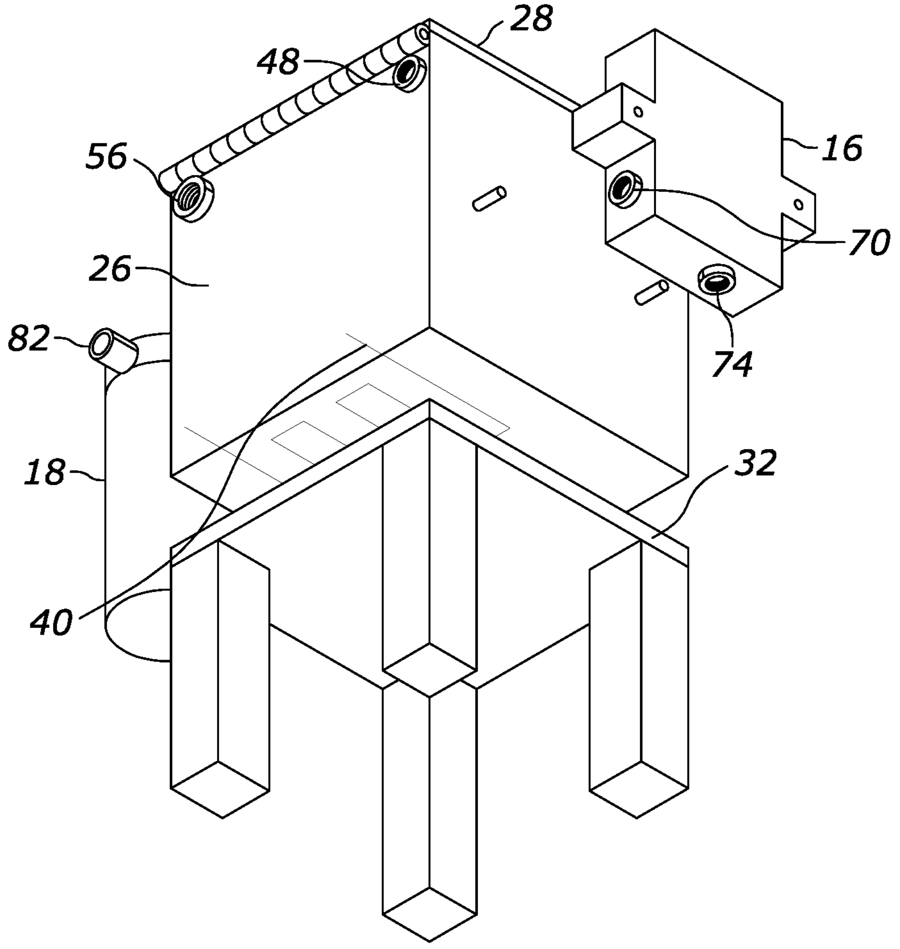
FIG. 3 illustrates a different exploded view of the smoking vessel cleaning apparatus, showing the housing, pump, and secondary tank, in accordance with at least one configuration.

FIG. 3 shows another view of the smoking vessel cleaning apparatus 10 wherein sidewall 26 is visible with further view of return port 56. The embodiment, as shown, additionally demonstrates the secondary tank port 48 which facilitates fluid and vapor communication between holding tank 46 and secondary tank 16. In some embodiments, secondary tank port 48 is positioned on alternate walls of the housing, such as sidewall 20. FIG. 3 additionally shows a heating element situated at the bottom of housing 12 to provide conductive heating to the bottom surface of the holding tank 46. As previously disclosed, alternate embodiments of a heating element 40 are considered as will be understood by those of ordinary skill in the art.

To operate the smoking vessel cleaning apparatus 10, a user first fills the holding tank 46 with solvent by way of the fill port 54. In some embodiments, the fill port will be readily accessible through the top wall 28 of the housing, in other embodiments the fill port may be readily available, as the top of the tank may function as the top surface of the apparatus. Once the tank is filled to a desirable level with solvent, in this embodiment the solvent being isopropyl alcohol, the secondary tank 16 is then filled with some amount of water to cool the solvent fumes as they travel out of the holding tank and into the secondary tank.

Prior to starting the pump 18, and preferably prior to activating the heating element, the smoking vessel 100 and/or accessory cleaning box should be prepared for cleaning. A smoking vessel 100 may be attached by inserting rubber stoppers into both ends of a smoking device, or by other means which may provide a water-tight seal between the tubes of circuit 65 and the smoking vessel. To prepare accessory cleaning box 20, the operator should ensure that the box 20 is appropriately connected to the tubes of circuit 67, such that a water-tight seal is formed, and further insert the devices to be cleaned into the box 20 before closing the lid and ensuring another water-tight seal. In some instances, only one of the cleaning circuits 65,67 may be utilized, in which case the valves 64,66 should be opened or closed accordingly.

Once the tanks have been filed and the devices to be cleaned have been positioned and connected appropriately, the operator may power-on the heating element to begin heating the solvent to a desirable temperature. In the current embodiment, the isopropyl alcohol should be heated above room temperature so as to improve the solubility properties of the isopropyl alcohol. The solvent is preferably not heated above its boiling point while in some configurations that may be permitted. The temperature sensor 44 and an associated switch that can cycle on and off the heater may be utilized to maintain the temperature of a solvent within a desired range. In the current embodiment, a temperature should be maintained around 140 degrees Fahrenheit (+/−10 degrees).

As the solvent approaches or is maintained within the desired temperature range, the operator may engage the pump to begin drawing solvent through the first and second cleaning circuits. As the solvent travels through the circuits it effectively cleans the smoking vessel and devices contained within the accessory cleaning box. Due to at least one of the flow rate, the pressure, the temperature and the solvent utilized, the solvent is effective in cleaning remote regions and in crevices of the smoking vessel. The user can continue to operate the system, so as to allow the solvent to continue to cycle though the system until the devices have obtained an acceptable level of cleanliness to the user, after which the system can be powered off. It is contemplated that the system may be coupled to a timer, wherein the run time may be automated.

While the system is heated and operating, solvent may vaporize within the holding tank 46 and if vaporized, it may pass into the secondary tank 16. As the solvent passes through the water of the secondary tank, the solvent recondenses due to the temperature of the water and collects within the tank. The inlet check valve 72 prevents water and condensed solvent from flowing back into the holding tank 46. This reclaimed solvent may be emptied from the secondary tank through the recycle port 74, and may be collected to be reused in future use of the apparatus.

Advantageously, the system can effectively clean otherwise inaccessible parts of the smoking vessel (and at the same time other components in the accessory cleaning box). It will be understood that a single system or multiple systems can be maintained at a location (such as a smoke shop, or smoke equipment shop). In other configurations, it is contemplated that the system can be made to be mobile wherein the system can be operated through battery power or through the use of fuels or the like, and maintained in a van or other vehicle. It is contemplated in such situations, that a user may travel from store to store and offer on-site cleaning services at such store locations, in addition to mobile service.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An apparatus for cleaning a smoking vessel, apparatus comprising:

a holding tank defining a cavity having at least one return port, at least one outlet port and a secondary tank port, each of which is in communication with the cavity, the holding tank structurally configured to hold a solvent;

a heating element positioned in proximity to the holding tank sufficient to heat the cavity of the holding tank;

a first cleaning circuit having a first portion with a first end in fluid communication with the at least one outlet port and a second end in fluid communication with a cavity of a smoking vessel, and a second portion having a first end in fluid communication with the cavity of the smoking vessel and a second end in fluid communication with the at least one return port;

a second cleaning circuit having a first portion with a first end in fluid communication with the at least one outlet port and a second end in fluid communication with an accessory cavity of an accessory cleaning box, and a second portion with a first end in communication with the accessory cavity and a second end in fluid communication with the at least one return port, the accessory cleaning box having a movable lid so as to provide access to the accessory cavity;

a pump positioned in at least one of the first portion and the second portion of the first or second cleaning circuits, structurally configured to circulate fluid through the first and second cleaning circuits; and a secondary tank having an inlet in fluid communication with the secondary tank port of the holding tank, the inlet being spaced apart from a bottom of the secondary tank, the secondary tank further including a vent.

2. The apparatus according to claim 1, further comprising a housing having a housing cavity, wherein the holding tank is positionable within the housing.

3. The apparatus according to claim 2, wherein the housing includes an upper wall which is movable so as to provide access to the housing cavity.

4. The apparatus according to claim 3, wherein the upper wall is hingedly coupled to a sidewall of the housing.

5. The apparatus according to claim 2, wherein at least one of the at least one return port, the at least one outlet port and the secondary tank port extends through a sidewall of the housing.

6. The apparatus according to claim 1, wherein the second portion of the first cleaning circuit joins the second portion of the second cleaning circuit prior to a pump inlet so that the pump is structurally configured to circulate fluid through both the first cleaning circuit and the second cleaning circuit simultaneously.

7. The apparatus according to claim 1, wherein the first portion of the first cleaning circuit includes a valve between the first end and the second end, the valve providing selective communication between the first and second ends of the first portion of the first cleaning circuit.

8. The apparatus according to claim 1, wherein the first portion of the second cleaning circuit includes a valve between the first end and the second end, the valve providing selective communication between the first and second ends of the first portion of the second cleaning circuit.

9. The apparatus according to claim 1, wherein the secondary tank further comprises a recycle port extending from a lower end of the secondary tank.

10. The apparatus according to claim 1, further comprising an inlet check valve positioned between the secondary tank and the holding tank, the check valve structurally configured to prevent backflow from the secondary tank to the holding tank.

11. The apparatus according to claim 1, wherein the pump comprises a self-priming diaphragm pump.

12. The apparatus according to claim 1, wherein the holding tank has a capacity of two gallons.

13. The apparatus according to claim 1, wherein the heating element further comprises a temperature sensor controlling an electronic switch wherein, the electronic switch is configured to selectively energize and deenergize the heating element, to, in turn, maintain the temperature of the solvent within a desired range.

14. The apparatus according to claim 13, wherein the temperature sensor and electronic switch are structurally configured to allow for automatic control of the heating element.

15. The apparatus according to claim 1, wherein the pump further comprises a level sensor coupled to an electronic switch wherein the level sensor is configured to selectively energize and deenergize the pump.

16. The apparatus according to claim 1, wherein the pump further comprises a timer coupled thereto, to, temporally control the operation of the pump.

* * * * *